E. SCHNEIDER.
BRAKE FOR GUNS.
APPLICATION FILED MAY 15, 1917.
1,310,881.
Patented July 22, 1919.
5 SHEETS—SHEET 1.
Fig. 1.
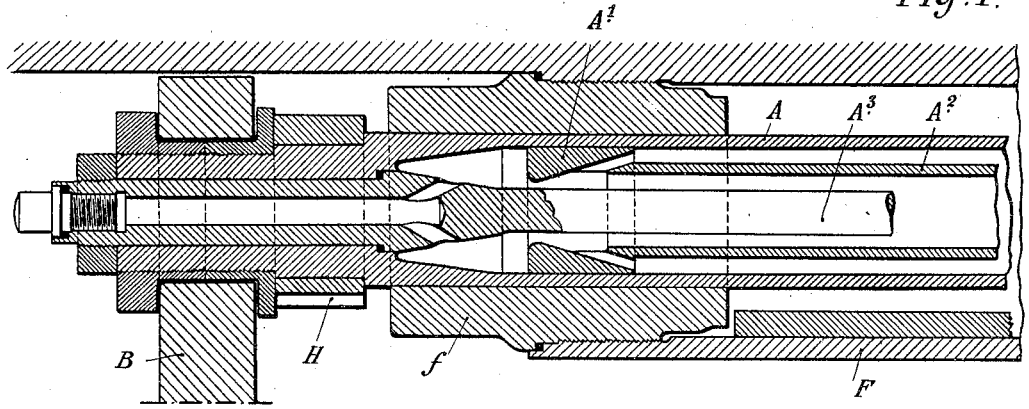
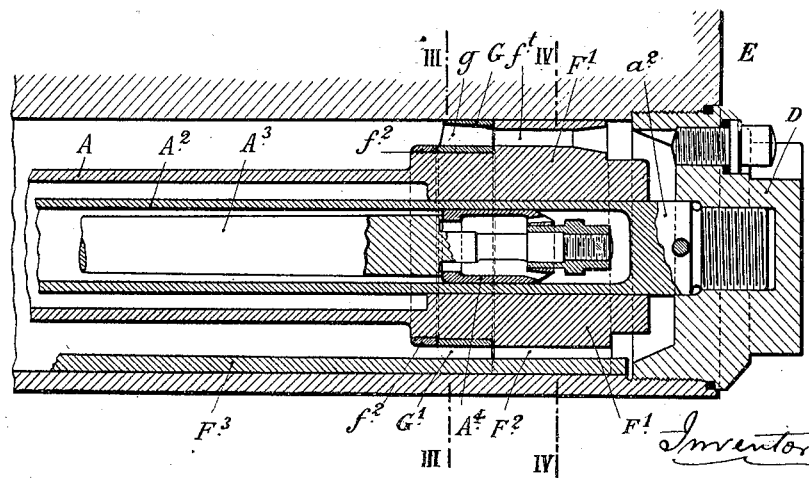
Inventor:
Eugène Schneider

E. SCHNEIDER.
BRAKE FOR GUNS.
APPLICATION FILED MAY 15, 1917.

1,310,881.

Patented July 22, 1919.
5 SHEETS—SHEET 5.

UNITED STATES PATENT OFFICE.

EUGÈNE SCHNEIDER, OF LE CREUZOT, FRANCE, ASSIGNOR TO SCHNEIDER & CIE., OF PARIS, FRANCE, A LIMITED JOINT STOCK COMPANY OF FRANCE.

BRAKE FOR GUNS.

1,310,881. Specification of Letters Patent. Patented July 22, 1919.

Application filed May 15, 1917. Serial No. 168,857.

*To all whom it may concern:*

Be it known that I, EUGÈNE SCHNEIDER, a citizen of the French Republic, and residing at Le Creuzot, Saône-et-Loire, France, have invented a new and useful Improvement in Brakes for Guns, which is fully set forth in the following specification.

In the known apparatus for varying the length of the recoil of guns according to the elevation of the gun barrel this variation is effected generally by modifying the relative positions of certain parts of the brake, more frequently by an angular displacement of the piston in relation to an axial counter-rod. This variation of position has the effect of throttling more or less during the recoil the flow of the body of liquid contained in the brake cylinder and between the various parts of the latter, in such a manner as to produce an increase of the pressure per unit of surface in the brake, and consequently a corresponding increase in the braking power.

In other words, compulsion is exerted upon a constant body of liquid in one and the same brake apparatus and it is allowed to flow with relative ease at low angles of fire when the recoil may be long, whereas the flow is hindered to a greater extent by throttling the orifices for the passage of the liquid at high angles of elevation when recoil is to be diminished, and thus increasing the pressure acting upon the liquid.

A very serious draw-back of those known devices is that the passing from the working with long recoil to working with short recoil, leads to such a reduction of the total section of the flow orifices that the "play" between the parts will then constitute an important fraction of the remaining flow section, so that in view of the increase pressure the leakage due to this "play" will hinder the production of the desired braking force.

The present invention allows of diminishing those draw-backs as much as possible.

The improved brake apparatus is characterized essentially by the combination of two brakes which employ entirely separate bodies of water and are designed to produce their useful action at long and short recoils respectively. One of the brakes, namely the long-recoil brake which may be of the usual axial counter rod type, employs only a small body of liquid and is designed to produce only small braking effects. It will produce its full effects only when by reason of the low elevation of the gun barrel, the parts of the other brake have not been moved into the requisite position for producing a braking effort that is capable of diminishing the recoil.

The other brake employs a large body of liquid, it is practically ineffective at low angles of elevation, whereas above a determined angle of inclination its parts are moved into the position required for producing a powerful braking effort. This increased effort is effected by presenting a very large thrust surface or abutment area to the large body of liquid which up to that moment has been flowing almost freely in the short-recoil brake.

In a word, the braking effort which is the product of the pressure per unit of area and the total area upon which this pressure acts, is not, as in the known apparatus, obtained by considerable increase of the pressure factor, but rather by an increase in the factor constituted by the thrust area of the liquid. When the short-recoil brake is set in operation, the long recoil brake in which the flow section for the liquid has not been diminished, remains practically inoperative.

It will be perceived that the regulation of the whole brake apparatus can thus be effected very easily and with complete certainty.

The reduction in the flow section for the purpose of shortening the recoil, no longer takes place in the brake worked with a small body of water wherein the pressure therefore does not increase, so that the causes of leakage are removed. The reduction of the sectional area is effected in the brake worked with a large body of water, wherein the "play" between the parts constitute only a very small fraction of the area upon which the pressure acts. Further, the influence of the "play" which is considerably diminished thereby, is still further diminished by the fact that the pressure in the brake at short-recoils is not appreciably increased in relation to the final pressure at long recoils.

The two brakes worked with separate bodies of liquid can be arranged side by side or parallel to each other. In practice with the object of reducing the bulk and weight of the parts, the brakes are preferably arranged with a common axis so that the short-recoil brake surrounds the long-coil brake. In such a case, the outer wall of the cylinder of the latter brake may be utilized to form the inner wall or piston rod of the short-recoil brake.

The manner in which this invention is to be performed will now be described more particularly with reference to the accompanying drawings which illustrate by way of example a practical constructional form of the last described arrangement. In these drawings:

Figure 1 is a vertical longitudinal section on the line I—I of Fig. 2.

Figure 3:
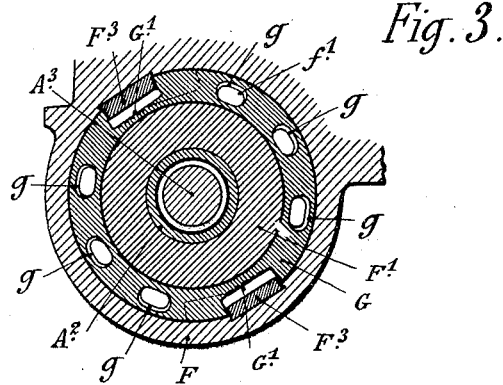

Fig. 3 is a cross section on the line III—III of Fig. 1.

Figure 2:
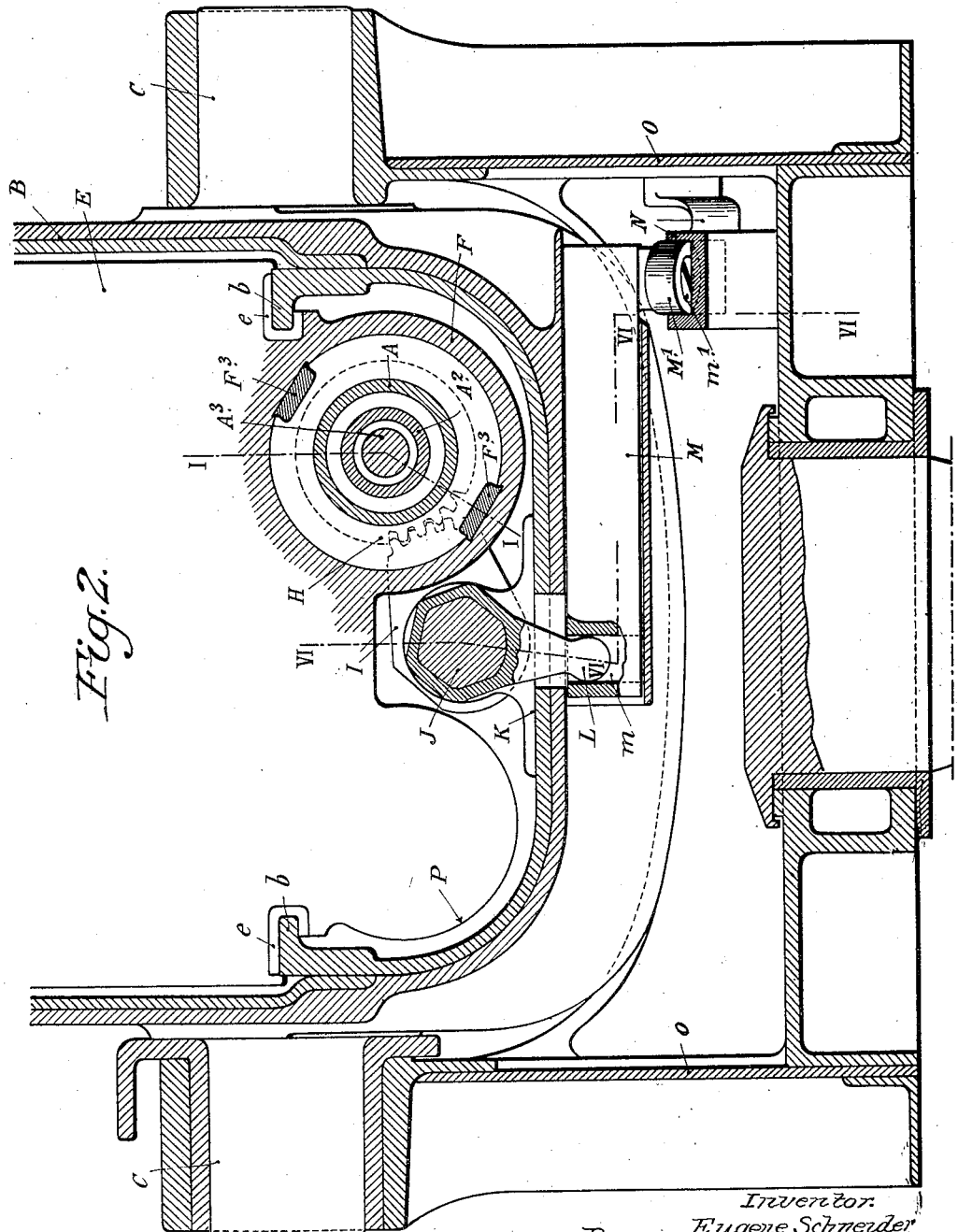
Fig. 2 is a cross section on the line II—II of Fig. 6, showing the mounting of the combined brakes on the slide of the gun and in relation to the cradle, as well as the device for automatic regulation of the short-recoil inclosing brake, by means of the elevation of the gun barrel.
Figure 4:
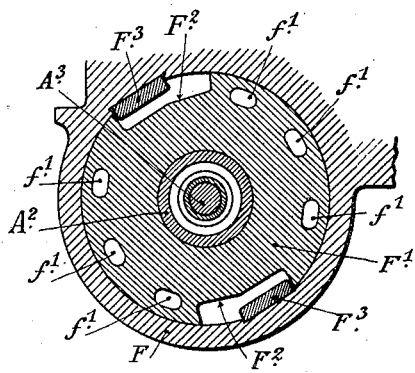

Fig. 4 is a cross section on the line IV—IV of Fig. 1, the parts being shown, as in Figs. 1, 2 and 3, in the position corresponding to low angles of elevation and consequently in the inoperative position of the short-recoil brake.

Figure 5:
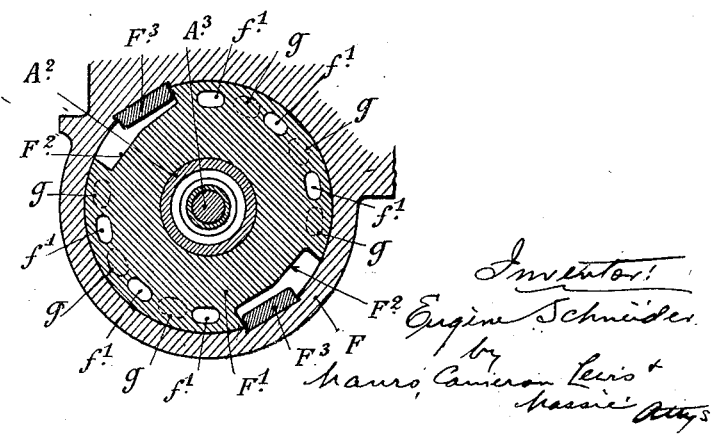

Fig. 5 is a cross section similar to that shown in Fig. 4, the parts being shown in the operative position of the short-recoil brake.

Figure 6:
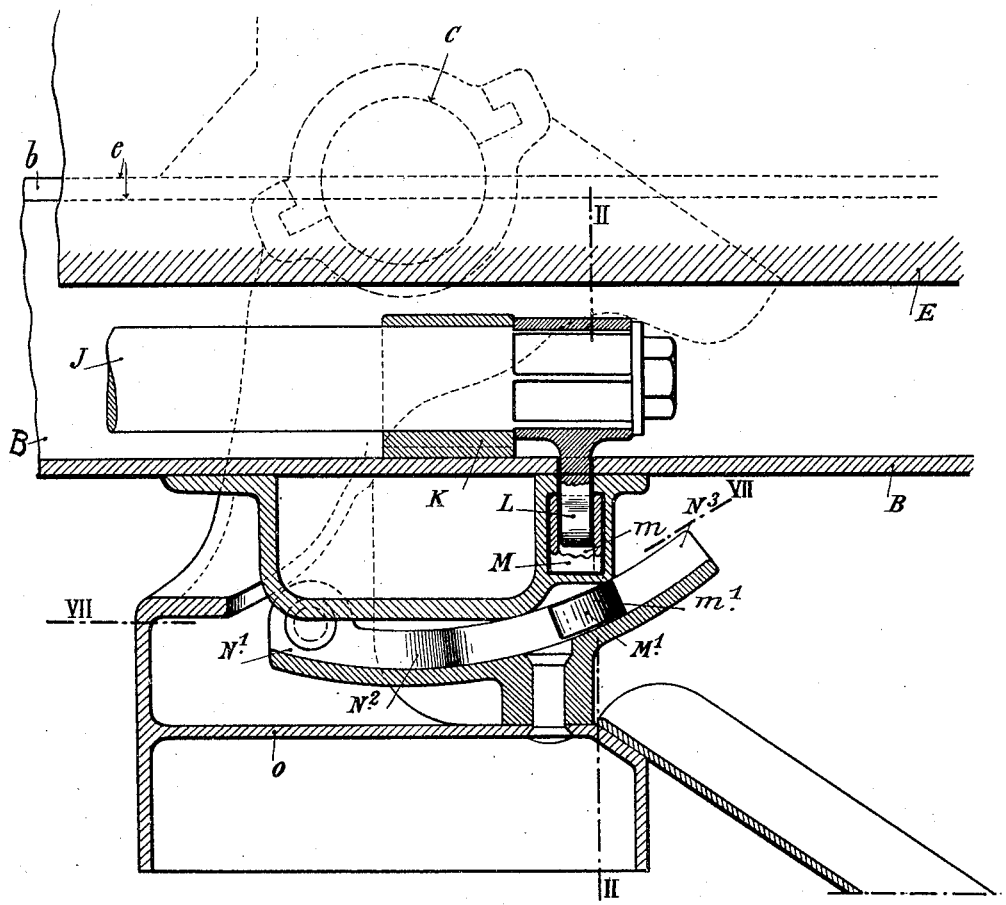

Fig. 6 is a section on the line VI—VI of Fig. 2; and

Figure 7:
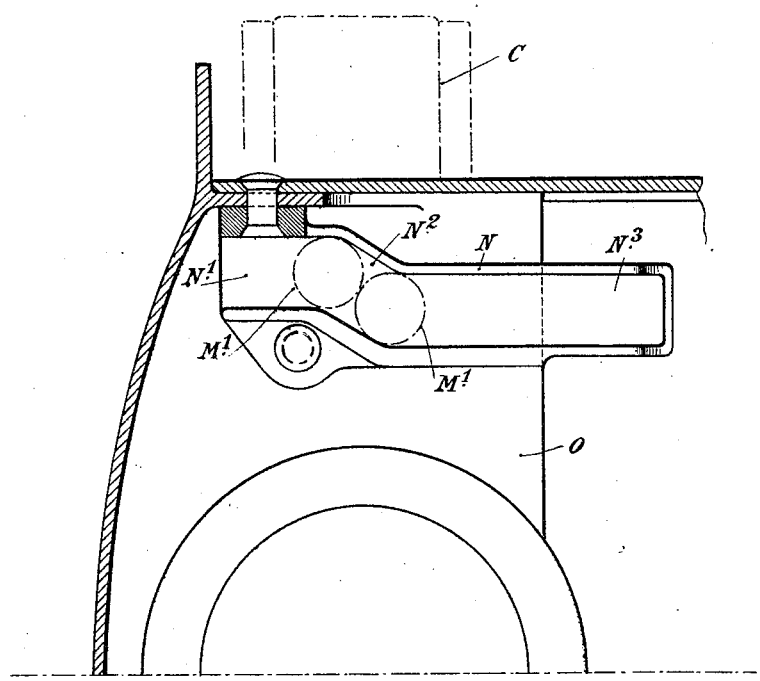

Fig. 7 is a horizontal section on the line VII—VII of Fig. 6.

As shown, the improved apparatus of combined brakes comprises a long-recoil brake of known construction. A is the cylinder of this brake attached to a fixed part B of the gun, such as the cradle, carrying the trunnions C (Fig. 2). In this cylinder A there is arranged to work in the usual manner a hollow piston $A^1$ whose hollow rod $A^2$ is attached at its solid outer end $a^2$ to a support D carried by the recoiling part, that is to say, the slide E; the latter moves in the usual manner by means of its guides $e$ along the corresponding ribs $b$ of the cradle B which has fixed to it the axial counter-rod $A^3$ carrying the usual device $A^4$ for regulating the running-out movement of the gun.

According to this invention, this known brake is combined with a brake which contains a body of liquid that is entirely separate from the body of liquid circulating in the former brake; it comprises a throttle device actuated by the elevation of the gun barrel and so arranged that the action of this second brake will produce a considerable and useful braking effect only at high angles of elevation. In order to reduce the bulk, this second brake combined with the former brake and utilizing a large and independent body of liquid, is arranged coaxially with the former. The cylinder of the short-recoil brake is for this purpose limited internally by the outer wall of the cylinder A, and externally by the inner wall of a jacket F provided under the slide E.

The ends of the short recoil-brake cylinder are constituted as regards the front end by a plug $f$ that surrounds the cylinder A, and as regards the rear end by the support D to which the long-recoil brake piston $A^2$—$a^2$ is attached.

The short-recoil brake cylinder is movable as shown; its end $f$ slides by means of a tight joint (not shown) on the fixed cylinder A of the long-recoil brake.

The piston $F^1$ of the short-recoil brake is fixed longitudinally and is constituted by an enlargement of the rear end of the cylinder A of the long-recoil brake. The reduction of the flow section for the liquid in the inclosing brake is effected in the construction shown by angular displacement of the piston $F^1$ pierced with orifices $f^1$, with relation to a fixed partition G which is pierced with corresponding orifices $g$.

As shown, the head of the piston $F^1$ has two diametrally opposite notches $F^2$, and in the non-notched portions a series of passages $f^1$. In the notches $F^2$ there engage the rear ends of two straight bars $F^3$ which are fixed in the wall of the cylinder F and whose cross sections diminish in height from their forward toward their rear ends.

On the front portion of the piston head $F^1$ there is mounted the annular partition G pierced with orifices or passages $g$ corresponding in number with the passages $f^1$ of the piston. All angular movement of this partition is prevented by its engagement by means of the notches $G^1$ with the straight bars $F^3$. All longitudinal shifting of the said partition is likewise prevented by its bearing at the rear against the front of the piston head $F^1$, and at the front against a retaining collar $f^2$.

The angular movements of the piston $F^1$ are produced by the following means:

The cylinder A of the long recoil brake which constitutes the rod of the piston $F^1$, may be journaled in the cradle B (Fig. 1) instead of being rigidly attached to the latter; it has fixed on it a toothed sector H engaging with a toothed sector I fixed on a shaft J which can revolve in bearings K (Figs. 2 and 6) that are likewise fixed to the cradle. The shaft J has fixed on it a finger L the end of which engages in a recess $m$ formed in one of the ends of a sliding block M guided in the cradle B. The sliding block M has projecting under its other end a pin

$m^1$ on which is mounted a roller $M^1$ that works in a guide N fixed to the gun carriage O.

The guide N has in plan the shape indicated in Fig. 7; it comprises two sections $N^1$ and $N^3$ parallel to the longitudinal axial plane of the gun, the rear section $N^3$ being situated farther from the said plane than the section $N^1$ to which it is connected by an inclined portion $N^2$. P represents the outline of an ordinary accumulator for running out the gun.

The hereinbefore described apparatus operates as follows:

So long as the gun barrel has a low elevation, any variation from this elevation will correspond to a displacement of the roller $M^1$ in the section $N^3$ of the guide N, and the parts of the two combined brakes will occupy before firing, the relative position indicated in Figs. 1 to 4 inclusive.

In these circumstances the body of liquid in the inclosing or short-recoil brake flows freely during the recoil of the gun barrel, through the ports $g$ of the disk G, and through the completely uncovered passages $f^1$ of the piston $F^1$. The liquid flows also between the straight bars $F^3$ and the completely uncovered cross section of the notches $F^2$ in the piston $F^1$.

In the recoil the inclosed brake furnishes of itself almost the whole of the braking effort.

When the gun barrel receives an elevation such that the roller $M^1$ is situated in the inclined portion $N^2$ of the guide N, the longitudinal movement of the slide block M will cause the finger L to turn and therefore the gear I—H the cylinder A to turn also. The result is that the piston $F^1$ will turn in relation to the disk G which is kept stationary by the straight bars $F^3$. In this movement the passages $f^1$ become shifted relatively to the ports $g$, and the entrance thereto is therefore covered by the full portions of the said disk. The closing of the passages $f^1$ which increases progressively according as the roller $M^1$ moves nearer to the entrance of the portion $N^1$ of the guide N, becomes total as soon as the roller enters the said portion $N^1$ (Fig. 5). The body of liquid in the inclosing brake can flow during the recoil only through the space left free between the notches $F^2$ of the piston $F^1$ and the straight bars $F^3$. The braking force produced by the inclosed brake is then considerably diminished; almost the whole of the requisite braking force is furnished by the inclosing brake.

The improved brake apparatus of this invention has in addition to the above stated advantages the following very important advantage: It is known that in the usual brakes such as the inside brake of the apparatus above described, owing to the increase in internal pressure there is produced in the regulator $A^4$ for running out the gun, during the short-recoil, a considerable corresponding counter pressure which is added to the force of the recoil and diminishes the braking force by an equal amount. In the improved apparatus on the contrary that drawback disappears almost entirely because the braking force during the short recoil is almost exclusively produced by the inclosing brake, and without an appreciable increase in the internal pressure in the inclosed brake which latter contains the regulator for running out the gun. In other words the counter-pressure which acts during the short recoil upon the regulator for running out the gun is practically negligible.

Having now described my invention, what I claim as new and desire to secure by Letters Patent is:

1. A brake apparatus for guns, characterized by the combination of two brakes working with entirely separate bodies of liquid each furnishing alternately almost the whole of the braking force, respectively during the long recoils and during the short-recoils; the liquid in the shore-recoil brake having an almost free flow during the long-recoils while it is caused to act upon a considerably increased cross-sectional area during the short-recoils.

2. A brake apparatus for guns as claimed in claim 1, wherein the short-recoil brake surrounds the long-recoil brake the arrangement being such that the cylinder of the long-recoil brake constitutes the piston rod of the short-recoil brake, and has a rear enlargement which constitutes the piston of the short-recoil brake.

3. A brake apparatus for guns as claimed in claim 2 wherein the piston of the short-recoil brake is provided with a plurality of ports, in combination with a disk having corresponding ports normally registering with those of the piston, means operable on changes in elevation of the gun to rotate said piston to control said disk ports, said disk being provided with a notch, and a locking bar carried by the short-recoil brake engaging said notch to hold said disk against rotation.

4. A brake apparatus for guns as claimed in claim 3 wherein the locking bar for the disk is provided with an inclined surface to permit flow through said notch during short recoil.

5. A brake apparatus for guns, comprising telescoping brake cylinders working with separate bodies of liquid of different volumes, and means responsive to changes in elevation of the gun for varying the flow section in the cylinder having the larger volume.

6. A brake apparatus for guns comprising telescoping brake cylinders working with separate bodies of liquid of different volumes, the inner cylinder being revoluble and provided with a piston head comprising annular valve members having openings adapted to register, one of said members being non-revoluble, and means controlled by changes in elevation of the gun for rotating said inner cylinder to operate said valve.

In testimony whereof I have signed this specification in the presence of two subscribing witnesses.

EUGÈNE SCHNEIDER.

Witnesses:
CHAS. P. PRESSLY,
ANDRÉ MOSTICKER.

Copies of this patent may be obtained for five cents each, by addressing the "Commissioner of Patents, Washington, D. C."